United States Patent [19]

Tanaka

[11] Patent Number: 4,722,982

[45] Date of Patent: Feb. 2, 1988

[54] COATING COMPOSITIONS FOR INTERIOR OF METAL CANS

[75] Inventor: Yukiyasu Tanaka, Hiratsuka, Japan

[73] Assignee: Kansai Paint Company, Limited, Hyogo, Japan

[21] Appl. No.: 907,916

[22] Filed: Sep. 16, 1986

[51] Int. Cl.$^4$ .............................................. C08L 63/00
[52] U.S. Cl. .................................... 525/481; 523/400; 525/523; 428/35
[58] Field of Search ................... 525/481, 485, 523; 428/35; 523/400

[56] References Cited

U.S. PATENT DOCUMENTS

| | | | |
|---|---|---|---|
| 3,932,144 | 1/1976 | Matsubara et al. | 525/481 X |
| 4,018,848 | 4/1977 | Khanna | 525/488 |
| 4,367,318 | 1/1983 | Ishimura et al. | 525/481 |

*Primary Examiner*—Theodore E. Pertilla
*Attorney, Agent, or Firm*—Armstrong, Nikaido, Marmelstein & Kubovcik

[57] ABSTRACT

This invention provides a coating composition to be applied to the inner surface of a can and comprising about 50 to about 90% by weight of a bisphenol A epoxy resin having an epoxy equivalent of about 1600 to about 5000 and about 10 to about 50% by weight of a phenol-aldehyde resin prepared by reacting 4.0 to 6.0 moles of a formaldehyde with 1 mole of a bisphenol A or with 1 mole of a mixture of a bisphenol A and a p-substituted monohydric phenol in an amount of about 1 mole or less per mole of the bisphenol A in the presence of a hydroxide of alkali metal.

6 Claims, No Drawings

COATING COMPOSITIONS FOR INTERIOR OF METAL CANS

This invention relates to coating compositions for interior coatings of cans, and more particularly to coating compositions useful for covering the interior of cans and outstanding in properties of protecting the inner surface of cans to preserve the product in the can against off-flavor, turbidity or like change, such as resistances to water, corrosion and the like, especially in properties of assuring the freedom from the off-flavor of the product.

Conventionally a protective coating composition has been applied to the interior of cans for containing beer, carbonated drink, fruit drink or the like to prevent the beverage from dissolving out and corroding the metal. In general, protective coating compositions heretofore used include epoxy resin-urea resin coating compositions, thermosetting vinyl resin coating compositions and the like, and may be used in two-coat system to apply, e.g. a combination of epoxy resin-urea resin coating (base coat) and straight vinyl resin coating (top coat).

With the recent increase in diversity of products to be canned, conventional epoxy resin-urea resin coating compositions or thermosetting vinyl resin coating compositions applied to the inside of cans have become unable to fully achieve the desired results in, e.g. flavor-retention. The interior coatings of two-coat system on cans containing beer, carbonated drink, fruit bevarage or the like, e.g. a combination of epoxy resin-urea resin coating (base coat) and straight vinyl resin coating (top coat), have the problem of being less corrosion-resistant in parts of cans subjected to impact processing, in worst case becoming perforated in such parts by corrosion. To overcome this problem, it is desired to develop coating compositions for the interior of cans and improved in the properties of protecting the inner surface of cans to preserve the product in the can against off-flavor, turbidity or like change, such as resistances to water, corrosion and the like.

We conducted extensive research to develop coating compositions superior to those known in the art in the properties of protecting the inner surface of cans to preserve the product in the can against off-flavor, turbidity or like change, especially in properties of assuring the freedom from the off-flavor of the product (hereinafter referred to as "flavor-retaining ability") and in quick baking ability, and found that the object of the present invention can be achieved by use of a coating composition comprising a specific epoxy resin and a phenol-aldehyde resin. The present invention has been accomplished based on this finding.

This invention provides a coating composition to be applied to the inner surface of a can and comprising about 50 to about 90% by weight of a bisphenol A epoxy resin having an epoxy equivalent of about 1600 to about 5000 and about 10 to about 50% by weight of a phenol-aldehyde resin prepared by reacting 4.0 to 6.0 moles of a formaldehyde with 1 mole of a bisphenol A or with 1 mole of a mixture of a bisphenol A and a p-substituted monohydric phenol in an amount of about 1 mole or less per mole of the bisphenol A in the presence of a hydroxide of alkali metal.

The coating compositions of the invention are applied to the interior of a can made of metals such as iron, aluminum or like single constituent or of tin-plated steel sheets, nickel-plated steel sheets, chromium-plated steel sheets or like surface-treated steel sheets. Also usable as such are these surface-treated steel sheets further plated with Fe, Zn, Mn or the like.

The coating compositions of the invention for the interior of a can will be described below in detail.

The coating composition of the invention for the interior of a can has incorporated therein an epoxy resin and a phenol-aldehyde resin useful as film-forming resins.

Epoxy resins useful in this invention are those of the solid bisphenol A type prepared by reacting bisphenol A, i.e. 2,2'-bis (4-hydroxyphenyl)propane, with epihalohydrin in the presence of an alkali as a catalyst and having an epoxy equivalent of about 1600 to about 5000, preferably about 2400 to about 3500. Examples of these epoxy resins are Epikote 1007 (having an average molecular weight of about 2900 and an epoxy equivalent of about 1900), Epikote 1009 ) (having an average molecular weight of about 3750 and an epoxy equivalent of about 2400 to about 3500), Epikote 1010 (having an average molecular weight of about 5500 and an epoxy equivalent of about 4000 to about 5000), etc., all manufactured by Shell Chemical Co., Ltd., U.S.A.

The bisphenol A epoxy resins having an epoxy equivalent of less than about 1600 give coating compositions having reduced fabrication property and impaired flavor-retaining ability. Those having an epoxy equivalent of more than about 5000 have the drawback of resulting in coating compositions having an increased viscosity and lower coating efficiency.

Also usable are epoxy resins which are a combination of a bisphenol A epoxy resin and a phenoxy resin similar in skeleton to bisphenol A epoxy resin and having a molecular weight of about 20000 or more. While the presence of the phenoxy resin improves the fabrication property of coat, an excessive amount of the phenoxy resin used tends to result in poor application property because of increase in viscosity of coating compositions. Accordingly it is desired that the amount of phenoxy resin to be combined with the epoxy resin be in the range of about 50% by weight or less, preferably about 5 to about 30% by weight.

The phenol-aldehyde resin to be used as the other component in the combination of film-forming resins is prepared by subjecting to condensation reaction a formaldehyde with a bisphenol A or a mixture of a bisphenol A and a p-substituted monohydric phenol in the presence of a hydroxide of alkali metal such as sodium hydroxide, potassium hydroxide or the like.

Examples of the p-substituted monohydric phenol to be mixed with the bisphenol A are p-cresol, p-tert-butylphenol, p-ethylphenol, p-tert-aminophenol, p-nonylphenol, p-phenylphenol, p-cyclohexylphenol, etc. These phenols are usable singly or at least two of them can be used in mixture. The ratio of the bisphenol A and the p-substituted phenol is such that usually about 1 mole or less, preferably about 0.1 to about 1.0 mole, more preferably about 0.4 to about 0.7 mole, of the p-substituted phenol is used per mole of the bisphenol A. Over about 1.0 mole of the p-substituted phenol is likely to reduce the flavor-retaining ability of coating compositions, whereas less than about 0.1 mole thereof tends to give coatings unsatisfactory in fabrication property and corrosion resistance.

The phenol-aldehyde resin to be included in the coating composition of the invention is prepared by reacting a phenol constituent with a formaldehyde in the presence of a hydroxide of an alkali as a catalyst. The amount of the formaldehyde relative to the phenol constituent is very important to obtain the contemplated coating composition having an improved flavor-retaining ability according to the invention. The formaldehyde is used in an amount of 4.0 to 6.0 moles, preferably about 4.5 to about 5.5 moles, per mole of the phenol constituent and in an excess amount relative to the theoretical amount (by mole) of the functional hydrogen atom of the phenol compound. Below 4.0 moles, the coating composition containing the phenol-aldehyde resin is poor in flavor-retaining ability, hence undesirable, whereas above 6.0 moles, the coating composition gives a coat poor in resistance to water and in flavor-retaining ability, hence undesirable.

The phenol-aldehyde resin useful in the invention is prepared in a suitable solvent, usually an aqueous one. All basic catalysts commonly used in the preparation of resol-type phenol resins can not be used as a catalyst in the reaction of the invention. The reaction of the invention needs to use a hydroxide of alkali metal as a catalyst to prepare the desired coating composition of the invention for the inside of cans and outstanding in flavor-retaining ability. The basic catalysts other than a hydroxide of alkali metal can not achieve the object of the invention. The amount of hydroxide of alkali metal to be present in the solvent is in the range of usually about 0.01 to about 0.5% by mole, preferably about 0.03 to about 0.1% by mole.

The conditions for the condensation reaction between the phenol constituent and the formaldehyde are not specifically limited but can be suitably determined over a wide range. Generally the reaction system is heated to about 80° to about 130° C. for about 1 to about 10 hours.

The resol-type phenol resin thus obtained is purified and separated from the reaction mixture by conventional methods.

The interior can coating composition is prepared by dissolving the bisphenol A epoxy resin and phenol-aldehyde resin in a solvent such as those heretofore used in the preparation of coating compositions such as ketones, alcohols, esters, hydrocarbons or the like, the amounts of the resins used being about 50 to about 90% by weight, preferably about 75 to about 85% by weight, of the former and about 50 to about 10% by weight, preferably about 25 to about 15% by weight, of the latter. Less than about 50% by weight of the epoxy resin significantly impairs the fabrication property of coat and is likely to reduce the food or drink in the can to off-flavor, whereas over about 90% by weight thereof decreases the water resistance of coat and the ratio of gel fraction.

In addition to the bisphenol epoxy resin and phenol-aldehyde resin, the coating composition of the invention can incorporate therein an acid catalyst such as phosphoric acid, phosphate or the like to improve the curability of coating compositions and can further contain other additives used for conventional coating compositions.

The coating composition of the invention thus obtained is applied to the interior of cans by a spray coater and heated to a temperature of about 150° to about 250° C. for about 0.5 to about 20 minutes for curing, whereby a coat is formed which has improved properties of protecting the inner surface of cans to preserve the product in the can against off-flavor, turbidity or like change. The coating composition of the invention is applied to a dry film thickness of usually about 2 to about 10μ. The 2-coat 2-bake system is available where coating of greater thickness is needed to minimize the metal-exposed portion of the can interior or to enhance the corrosion resistance.

The coating composition of the invention to be applied to the inside of cans is outstanding in the properties of protecting the inner surface of the can to preserve the product in the can against impairments, such as resistances to water, corrosion and the like, particularly in flavor-retaining ability and also excellent in quick drying property.

The invention will be described below in greater detail with reference to the following Examples in which the parts and percentages are all by weight, unless otherwise specified.

PREPARATION EXAMPLE 1

Preparation of an epoxy resin solution (A)

Epikote 1009 (tradename, product of Yuka Shell Epoxy Co., Ltd., Japan) was dissolved in a 1:1:1:1 solvent mixture of xylene, methyl ethyl ketone (M.E.K.), methyl isobutyl ketone (M.I.B.K.) and cellosolve, giving an epoxy resin solution (A) having a solids content of 20%.

PREPARATION EXAMPLE 2

Preparation of an epoxy resin solution (B)

Epikote 1007 (tradename, product of Yuka Shell Epoxy Co., Ltd.) was dissolved in a 1:1:1:1 solvent mixture of xylene, M.E.K., M.I.B.K. and cellosolve, giving an epoxy resin solution (B) having a solids content of 20%.

PREPARATION EXAMPLE 3

Preparation of a phenol resin solution (C)

A mixture of 0.7 mole of bisphenol A, 0.3 mole of p-cresol and 4.5 moles of formaldehyde (37% formalin) was heated to 50° C. To the mixture was added 0.04 mole of sodium hydroxide as a catalyst. The mixture was reacted at 100° C. for 1 hour. After completion of the reaction, 0.02 mole of sulfuric acid was added to neutralize the mixture. Thereto added were 50 parts of xylene, 100 parts of butanol and 50 parts of cyclohexanone per 100 parts of the resin product thus prepared to extract the resin with these solvents. The extract was washed with deionized water five times at 50° C. The mixture was subjected to azeotropic distillation to remove the water so that not more than 1% of water remained in the system. To the resulting mixture was added 1-butanol to adjust the solids content, giving a phenol resin solution (C) having a solids content of 50%, a viscosity of N (measured at 25° C. by a Gardner-Holdt bubble viscometer), a Gardner color scale of I and water content of 0.6%.

PREPARATION EXAMPLE 4

Preparation of a phenol resin solution (D)

A mixture of 1 mole of bisphenol A, 0.2 mole of p-cresol, 4.9 moles of formaldehyde (37% formalin) and 0.05 mole of sodium hydroxide was subjected to reaction in 1-butanol in the same manner as done in Preparation Example 3, producing a phenol resin. The phenol resin thus obtained was mixed with 1-butanol to adjust the solids content, affording a phenol resin solution (D) having a solids content of 50% and a viscosity of K (measured at 25° C. by a Gardner-Holdt bubble viscometer).

PREPARATION EXAMPLE 5

Preparation of a phenol resin solution (E)

A mixture of 0.65 mole of bisphenol A, 0.35 mole of p-cresol, 5.5 moles of formaldehyde (37% formalin) and 0.05 mole of sodium hydroxide was subjected to reaction in 1-butanol in the same manner as done in Preparation Example 3, producing a phenol resin. The phenol resin thus obtained was mixed with 1-butanol to adjust the solids content, giving a phenol resin solution (E) having a solids content of 50% and a viscosity of I (measured at 25° C. by a Gardner-Holdt bubble viscometer).

PREPARATION EXAMPLE 6

Preparation of a phenol resin solution (F)

A mixture of 1 mole of bisphenol A, 6 moles of formaldehyde (37% formalin) and 0.05 mole of sodium hydroxide was subjected to reaction in 1-butanol in the same manner as done in P.eparation Example 3, producing a phenol resin. The phenol resin thus obtained was mixed with 1-butanol to adjust the solids content, giving a phenol resin solution (F) having a solids content of 50% and a viscosity of M (measured at 25° C. by a Gardner-Holdt bubble viscometer).

EXAMPLE 1

The epoxy resin solution (A) obtained in Preparation Example 1 (250 parts, solids content of 50 parts) and 100 parts of the phenol resin solution (C) obtained in Preparation Example 3 (solids content of 50 parts). A phosphoric acid was added to the mixture in an amount of 1.0 part per 100 parts of the resin. To the mixture was added a 1:1 solvent mixture of xylene and M.I.B.K. to adjust the solids content to 20%, giving a coating composition.

The coating composition thus obtained was applied to the inside of a 2-piece aluminum can (350 ml) by a hot airless spray to form a dried coat 3 to 5μ in thickness. The interior coating was baked at 210° C. for 2 minutes, and tested for performance by the methods to be described later with the results shown below in Table 2.

EXAMPLES 2 to 8

Coating compositions were prepared from the components shown below in Table 1 each in the listed amount and applied to the inner surface of an aluminum can in the same manner as in Example 1. The coated inner surface of the can was tested for performance by the methods to be described later with the results indicated below in Table 2.

TABLE 1

| Ex. | Epoxy resin (A) | Epoxy resin (B) | Phenol resin (C) | Phenol resin (D) | Phenol resin (E) | Phenol resin (F) | Phosphoric acid (PHR) |
|---|---|---|---|---|---|---|---|
| 1 | 50 |  | 50 |  |  |  | 1.0 |
| 2 | 75 |  | 25 |  |  |  | 1.0 |
| 3 | 85 |  | 15 |  |  |  | 1.0 |
| 4 | 90 |  | 10 |  |  |  | 1.0 |
| 5 |  | 85 |  | 15 |  |  | 1.0 |
| 6 | 85 |  |  | 15 |  |  | 1.0 |
| 7 | 85 |  |  |  | 15 |  | 1.0 |
| 8 | 75 |  |  |  |  | 25 | 1.0 |

Note:
The amounts of epoxy resin and phenol resin in Table 1 are based on the solids content.

COMPARISON EXAMPLE 1

The general procedure of Example 1 was repeated with the exception of using a commercially available epoxy resin-urea resin coating composition (tradename "XJ-K164D-2," product of Kansai Paint Co., Ltd., Japan) to coat the inner surface of an aluminum can with the coating composition.

COMPARISON EXAMPLE 2

The general procedure of Example 1 was repeated with the exception of using a commercially available thermosetting vinyl resin coating composition (tradename "SJ-6839-009", product of Kansai Paint Co., Ltd., Japan) to coat the inner surface of an aluminum can with the coating composition.

The aluminum cans thus coated in its inside in Comparison Examples 1 and 2 were tested for performance by the methods to be described later with the results shown below in Table 2.

TABLE 2

|  | Water resistance | | Fabrication (mA) | Corrosion resistance | Resistance to M.E.K. (strokes) | Amount of consumed KMnO$_4$ (ppm) | Flavor-retaining ability | Turbidity | |
|---|---|---|---|---|---|---|---|---|---|
|  | Blushing | Adhesion |  |  |  |  |  | (A)* | (B)** |
| Ex. | | | | | | | | | |
| 1 | 10 | 8 | 4.0 | 10 | 100< | 3.1 | 0.9 | 2.45 | 1.50 |
| 2 | 10 | 10 | 3.4 | 10 | 100< | 2.9 | 0.7 | 2.28 | 1.43 |
| 3 | 10 | 10 | 2.0 | 10 | 100< | 2.7 | 0.6 | 2.30 | 1.53 |
| 4 | 8 | 10 | 1.5 | 7 | 30 | 1.9 | 0.9 | 2.15 | 1.35 |
| 5 | 10 | 10 | 1.3 | 10 | 100< | 2.0 | 0.4 | 2.20 | 1.45 |
| 6 | 10 | 10 | 2.9 | 10 | 100< | 2.6 | 0.5 | 2.35 | 1.52 |
| 7 | 10 | 10 | 1.9 | 10 | 100< | 2.5 | 1.3 | 2.42 | 1.50 |
| 8 | 8 | 10 | 2.8 | 10 | 100< | 3.0 | 0.7 | 2.40 | 1.55 |
| Comp. Ex. | | | | | | | | | |
| 1 | 10 | 10 | 2.6 | 7 | 100< | 2.9 | 0.8 | 3.20 | 2.08 |

TABLE 2-continued

| | Water resistance | | Fabrication (mA) | Corrosion resistance | Resistance to M.E.K. (strokes) | Amount of consumed KMnO4 (ppm) | Flavor-retaining ability | Turbidity | |
| | Blushing | Adhesion | | | | | | (A)* | (B)** |
| --- | --- | --- | --- | --- | --- | --- | --- | --- | --- |
| 2 | 10 | 10 | 1.2 | 6 | 100< | 12.7 | 1.0 | 2.65 | 1.85 |

Note:
*(A) = turbidity measured at the time described hereinbefore in the test method.
**(B) = turbidity measured after storing for 3 months.

The performance tests with the results shown in Table 2 were conducted by the following methods.

Test for Water Resistance

The coated can was completely immersed in boiling water and left to stand therein for 30 minutes. The can was withdrawn from the boiling water, cooled to room temperature and observed to determine the degree of blushing to the coated can. The coat free of any change was rated 10 and the coat significantly blushed was rated 0. The can was cut open and the inner surface of the can was cut crisscross with a razor blade to the substrate so that three parallel linear cuts, spaced apart by 5 mm from each other and about 30 mm in length, were made to cross three like cuts at right angles. The cellophane adhesive tape (product of Sekisui Chemical Co., Ltd., Japan) was adhered to the surface thus crisscross cut and was quickly peeled off the surface to observe whether the coat was removed from the surface and adhered to the adhesive portion of the tape thus peeled. The degree of peeling was evaluated on ratings of between 0 to 10. It was rated 0 when the coat was completely peeled off the surface and adhered to the tape whereas it was rated 10 when the coat completely remained on the surface.

Test for Fabrication Property

The coated can was cut open and six test pieces were cut out of the can main body. The six cutouts measured 4 cm in width (in the direction of having cut open the can) and 5 cm in length. The test pieces were gradually bent double (to 180°) lengthwise with the coated surface outwardly directed. Three aluminum sheets having a thickness of 0.34 mm and greater in area than the test piece (suitably 5 cm × 10 cm) were inserted in between the two ends of each folded test piece. The coated surface of each test piece was covered with a soft vinyl sheet having a thickness of 1 mm for protection against marring. A load weighing 3 kg was dropped from a height of 42 cm onto the bent portion of each test piece to undergo impact processing. To evaluate the degree of damage, the portion of the test piece thus fabricated and measuring 20 mm in width was immersed in a 1% sodium chloride solution and an electric current was passed through the solution at 6.5 V for 6 seconds to determine the required amount of electricity (mA). The smaller the amount of electricity the better the result of fabrication.

Test for corrosion resistance

The coated can was necked to form a flange in an aluminum easy-open end. Into the can was packed 230 ml of an aqueous solution of 5 parts of sodium chloride, 5 parts of citric acid and 5 parts of malic acid in 100 parts of deionized water and the aluminum easy-open end was closed by conventional double seaming method. The can was stored in a thermostatic chamber at 50° C. for 7 days. Then the can was cut open to observe the degree of corrosion. The can was evaluated on a 10-point scale by the following criterion: the can free from any corrosion was rated 10 while the can significantly eroded was rated 0.

Test for Resistance to M.E.K.

Sixteen pieces of gauze (as specified in Japanese Pharmacopoeia) were superposed over the hemispherical top (namely the portion opposed to the flat portion used for pounding) of the head of a 2-lb hammer and were fixed thereto with rubber bands. The test pieces (cutouts from the coated can) were placed on the flat nonslippery surface of a solid body with the coated surface of each test piece (coated inner surface of can) upwardly turned while a ruler was disposed on the coated surface thereof at a right angle to the direction in which the can had been subjected to drawing process. The head of the hammer covered atop with the gauzes was dipped into an M.E.K. in a suitable container up to the lower end of the rubber bands. The hammer was taken out of the container and lightly shaken to return the dripping of M.E.K. to the container. The test piece and the ruler were firmly pressed down with one hand while the hammer was placed on the test piece with its hemispherical head portion surrounded with the gauzes in contact therewith so that the vertical axis of the hammer was perpendicular to the test piece. The handle of the hammer was gently held by the other hand and the hammer was moved forward and backward along one lengthwise end of the ruler as a guide with strokes of 80 to 90 mm without exerting any pressure other than by the weight of the hammer. The strokes were continued by rubbing the same coated portion of the test piece until the substrate became exposed. The number of to-and-fro strokes (one forward and backward movement being calculated as one stroke) required for the exposure of substrate was counted.

Test for Flavor

Tap water treated with activated carbon was packed into the coated can. The can was hermetically sealed and immersed in a thermostatic water bath at 95° to 99° C. for 30 minutes. The water in the can was poured into a glass bottle and cooled to room temperature for use as a test liquid. On the other hand, a quantity of tap water treated with activated carbon was charged into a glass bottle, subjected to the same procedure as above and cooled to room temperature for use as a control. Six persons tasted the test liquid and the control to determine the degree of difference therebetween in flavor-retaining ability. The test was repeated twice. The evaluation was conducted on ratings of between 0 to 5: the test liquid scarcely differing from the control in flavor-retaining ability was rated 0 while the test liquid markedly different was rated 5. The total of six persons' evaluations was divided by 12 to obtain the eventual rating.

Test for Consumption of KMnO4

A test liquid and a control were prepared in the same manner as in the flavor test. The liquids were subjected to the test as prescribed under the Food Sanitation Act in Japan to determine the amount of consumed KMnO4.

The amount of KMnO$_4$ consumption in the coat is given by:

The amount of KMnO$_4$ consumption in the test liquid — the amount of KMnO$_4$ consumption in the control Test for Turbidity Beer was packed into the coated can, stored at 60° C. for three days, quickly cooled and stored again at 0° C. for one day. The turbidity (haze) of the beer was measured in a thermostatic chamber at 5° C. by a turbidimeter ("Model 1001DP," manufactured by Nihon Denshoku Kogyo Kabushiki Kaisha, Japan).

I claim:

1. A solvent-based coating composition to be applied to the inner surface of a beverage can and comprising about 50 to about 90% by weight of a bisphenol A epoxy resin having an epoxy equivalent of about 1600 to about 5000 and about 10 to about 50% by weight of a phenol-aldehyde resin prepared by reacting 4.5 to 6.0 moles of a formaldehyde with 1 mole of a bisphenol A or with 1 mole of a mixture of a bisphenol A and a p-substituted monohydric phenol in an amount of about 1 mole or less per mole of the bisphenol A in the presence of a hydroxide of alkali metal.

2. A coating composition according to claim 1 wherein the p-substituted monohydric phenol is at least one phenol selected from the group consisting of p-cresol, p-tert-butylphenol, p-ethylphenol, p-tert-aminophenol, p-nonylphenol, p-phenylphenol and p-cyclohexylphenol.

3. A coating composition according to claim 1 or 2 wherein about 0.1 to about 1.0 mole of the p-substituted monohydric phenol is used per mole of the bisphenol A.

4. A coating composition according to claim 3 wherein the phenol-aldehyde resin is a reaction product of 4.5 to about 5.5 moles of a formaldehyde with about 1 mole of a bisphenol A or about 1 mole of a mixture of a bisphenol A and a p-substituted monohydric phenol.

5. A coating composition according to claim 4 which comprises about 75 to about 85% by weight of the bisphenol A epoxy resin and about 25 to about 15% by weight of the phenol-aldehyde resin.

6. A coating composition according to claim 1 further comprising a volatile organic solvent.

* * * * *